United States Patent
Sørensen et al.

(10) Patent No.: US 10,280,099 B2
(45) Date of Patent: May 7, 2019

(54) METHOD FOR BIOLOGICAL PURIFICATION OF WASTE WATER

(71) Applicant: Hias Miljøpartner AS, Hamar (NO)

(72) Inventors: Gjermund Sørensen, Stange (NO); Sondre Eikås, Hamar (NO); Torgeir Saltnes, Eidsvoll (NO)

(73) Assignee: Hias How2O AS, Hamar (NO)

( * ) Notice: Subject to any disclaimer, the term of this patent is extended or adjusted under 35 U.S.C. 154(b) by 0 days.

(21) Appl. No.: 15/313,698

(22) PCT Filed: May 28, 2015

(86) PCT No.: PCT/EP2015/061871
§ 371 (c)(1),
(2) Date: Nov. 23, 2016

(87) PCT Pub. No.: WO2015/181307
PCT Pub. Date: Dec. 3, 2015

(65) Prior Publication Data
US 2017/0158534 A1    Jun. 8, 2017

(30) Foreign Application Priority Data
May 28, 2014    (NO) .................................. 20140660

(51) Int. Cl.
*C02F 3/30*    (2006.01)
*C02F 3/08*    (2006.01)
*C02F 101/10*    (2006.01)

(52) U.S. Cl.
CPC ................ *C02F 3/308* (2013.01); *C02F 3/08* (2013.01); *C02F 2101/105* (2013.01); *Y02W 10/15* (2015.05)

(58) Field of Classification Search
CPC ....... C02F 3/308; C02F 3/08; C02F 2101/105
(Continued)

(56) References Cited

U.S. PATENT DOCUMENTS

| 3,654,147 A | * | 4/1972 | Levin et al. .......... C02F 1/5236 210/625 |
| 4,500,429 A | * | 2/1985 | Reimann ................. C02F 3/087 210/616 |
| 2008/0053897 A1 | | 3/2008 | Zhu et al. |
| 2013/0264280 A1 | * | 10/2013 | Zhao ........................ C02F 3/10 210/605 |

FOREIGN PATENT DOCUMENTS

CN    201999792 U    10/2011
DE    33 01 643 A1    7/1984
(Continued)

OTHER PUBLICATIONS

International Search Report issued in corresponding application No. PCT/EP2015/061871 dated Sep. 3, 2015 (4 pages).
(Continued)

*Primary Examiner* — Fred Prince
(74) *Attorney, Agent, or Firm* — Osha Liang LLP (57) ABSTRACT

A circulating moving bed biofilm method for biological purification of waste water in a continuous process includes receiving a pretreated waste water inlet stream in an anaerobic zone of a reactor wherein micro-organism culture exist on free flowing biofilm carriers, letting the waste water stream with the biofilm carriers into an aerobic zone aerating the waste water stream and carriers received from the anaerobic zone, at an end of the aerobic zone, transferring the biofilm carriers to the anaerobic zone without transfer of water, and discharging the water through an outlet to a sludge separation process.

11 Claims, 5 Drawing Sheets

(58) Field of Classification Search
USPC ....... 210/605, 615, 616, 617, 630, 150, 151, 210/252, 259, 906
See application file for complete search history.

(56) References Cited

FOREIGN PATENT DOCUMENTS

| DE | 19501260 C1 | 6/1996 |
|---|---|---|
| JP | H07163994 A | 6/1995 |
| JP | H07163995 A | 6/1995 |
| WO | 2010140898 A1 | 12/2010 |

OTHER PUBLICATIONS

Written Opinion of the International Searching Authority issued in corresponding application No. PCT/EP2015/061871 dated Sep. 3, 2015 (5 pages).

Norwegian Search Report issued in corresponding Norwegian application No. 20140660 dated Dec. 8, 2014 (2 pages).

Li et al., "Simultaneous carbon and nitrogen removal with enhanced bioparticle circulation in a Circulating Fluidized Bed Biofilm Reactor"; Chemical Engineering Journal, 181-182, pp. 35-44; 2012 (10 pages).

International Preliminary Report on Patentability issued in corresponding application No. PCT/EP2015/061871 dated Sep. 23, 2016 (13 pages).

Office Action issued in European Application No. 15725340.2, dated Apr. 3, 2018 (6 pages).

Majid Kermani et al: "Biological phosphorus and nitrogen removal from wastewater using moving bed biofilm process", Iranian Journal of Biotechnology, vol. 7, No. 1, Jan. 2009, Jan. 31, 2009 (Jan. 31, 2009), pp. 19-27, XP055275877 (9 pages).

\* cited by examiner

METHOD FOR BIOLOGICAL PURIFICATION OF WASTE WATER

FIELD OF INVENTION

The invention relates to a method for the purification of phosphorous, nitrogen and organic material from waste water in a continuous biofilm process with circulating carrier media. Further the invention relates to a reactor for use in carrying out the method.

BACKGROUND OF INVENTION

Municipal waste water and industrial waste water e.g. from food industry, contain organic material and are also rich in nitrogen and phosphorous compounds, and thus purification of such waste water is necessary before the purified water is discharged to natural recipients like lakes, rivers and the sea.

Biological reactors are used for breakdown of organic and inorganic substrates in municipal and industrial waste water. Commercially there are two main types of biological reactors i) activated sludge reactors and ii) biofilm reactors. In activated sludge reactors the microorganisms are suspended in the waste water. In a biofilm reactor the microorganisms grow on carrier media. The carrier media can either be stationary e.g. surfaces of large drums or the reactor walls or free flowing smaller carrier elements.

Activated sludge reactors allow a continuous process; however such reactors are very area/volume consuming, and this is also the case for the final sludge separation by sedimentation. A portion of the sludge is recycled into the reactor or inlet stream of the reactor to maintain the microbiological culture.

Moving bed biofilm reactors are operated continuously or in batches. Enhanced biological phosphorous removal can only be applied in such a system if it is run in batches, i.e. the waste water is let into the reactor for treatment and the treated water is discharged before the reactor can be refilled with waste water. This implies that for each volume treated there is a time consuming filling and draining sequence. The method is thus laborious and will normally demand that series of reactors are operated in parallel.

Separation of sludge and water after the biological process is easier for a biofilm process than an activated sludge process. A biofilm process needs a smaller reactor volume than an activated sludge process, and also has no recycling of sludge demanding process control and energy. Since there is no recycling from the separation step in the biofilm process, the performance of the separation does not affect the biological process.

WO 2010/140898 A1 relates to a method and apparatus for biological purification of water in a reactor with one or more inlet and outlet zones where water and substrate come into contact with carrier elements for a biofilm.

US 2008/0053897 A1 disclose a liquid-solid fluidized bed waste water treatment system for simultaneous carbon, nitrogen and phosphorous removal. The system incorporates the fixed-film biological fluidized bed technology with the biological nutrient removal in a twin liquid-solid fluidized bed, which has achieved the simultaneous elimination of organic carbon, nitrogen and phosphorous.

Other publications concerned with water purification/treatment JPh 07163994 A, JP h 07163995 A, DE 19501260 C1 and Li, M., Nakhla, G., Zhu J., "Simultaneous carbon and nitrogen removal with enhanced bioparticle circulation in a circulating fluidized bed biofilm reactor". Chem. Eng. Jour. 181-182 (2012) 35-44.

SUMMARY OF THE INVENTION

One or more embodiments of the present invention relate to a method for the purification of phosphorous, nitrogen and organic material from waste water in a continuous biofilm process with circulating carrier media and a reactor for use in carrying out the method.

One or more embodiments of the present invention provide a Circulating Moving Bed Biofilm Reactor and method for treatment of different wastewaters. Biofilm carriers are circulated with the wastewater between different zones in the treatment plant, before the carriers are mechanically removed from the water and introduced at the beginning of the process.

DETAILED DESCRIPTION OF THE INVENTION

Enhanced biological removal of phosphorous involves subjecting the microorganism culture e.g. bacterial culture to alternating anaerobic and aerobic conditions. In an activated sludge installation this is simply done by leading the wastewater with the activated sludge from an anaerobic to an aerobic reactor and recycling sludge from the settling process to the anaerobic section. Phosphorous Accumulating Organisms, PAO, secrete phosphorous under anaerobic conditions, and are able to take up more phosphorous when subjected to aerobic conditions. Thus, in a bio-P (biological phosphorous) installation it is necessary to expose the sludge/bacteria to alternating anaerobic and aerobic conditions. Most bio-P installations today are activated sludge installations. A few biofilm installations with enhanced phosphorous removal exists, however, these are non-continuous batch installations, so-called Sequencing Batch reactor, (SBR). Here the carrier media with biofilm is in a reactor to which the waste water is added and is subjected to a period without air (anaerobic) and in a period with air (aerobic) before the purified water is drained off and the reactor re-filled with untreated waste water.

In biological removal of nitrogen/ammonium, there are different bacterial cultures responsible for different parts of the breakdown of ammonium in the waste water. The first step is nitrification which takes place under aerobic conditions; the second step is de-nitrification taking place under anoxic (without oxygen, with nitrate) conditions. This can be carried out in two different biofilm reactors each having its carrier media where only the waste water flows from one reactor to the other.

One or more embodiments of the present invention enable the possibility to combine the biofilm process' advantages with enhanced biological phosphorous removal in a continuous process. Thus, one or more embodiments of the present invention provide new biological waste water purification processes.

The process according to one or more embodiments of the present invention involves that the carrier media for the biofilm is moved or flows with the waste water between anaerobic and aerobic and optionally anoxic reactor zones. From the last step in the process the carrier media is moved without water to the start of the process.

Before the waste water stream is allowed into the biological reactor the raw waste water stream is subjected to pretreatment. The pretreatment is usually mechanical screening to remove large objects such as plastic, fabrics and the like, followed by sand and grease removal. Depending on the quality and origin of the wastewater, sedimentation or fine screening can also be introduced as pretreatment steps.

Figure 1:
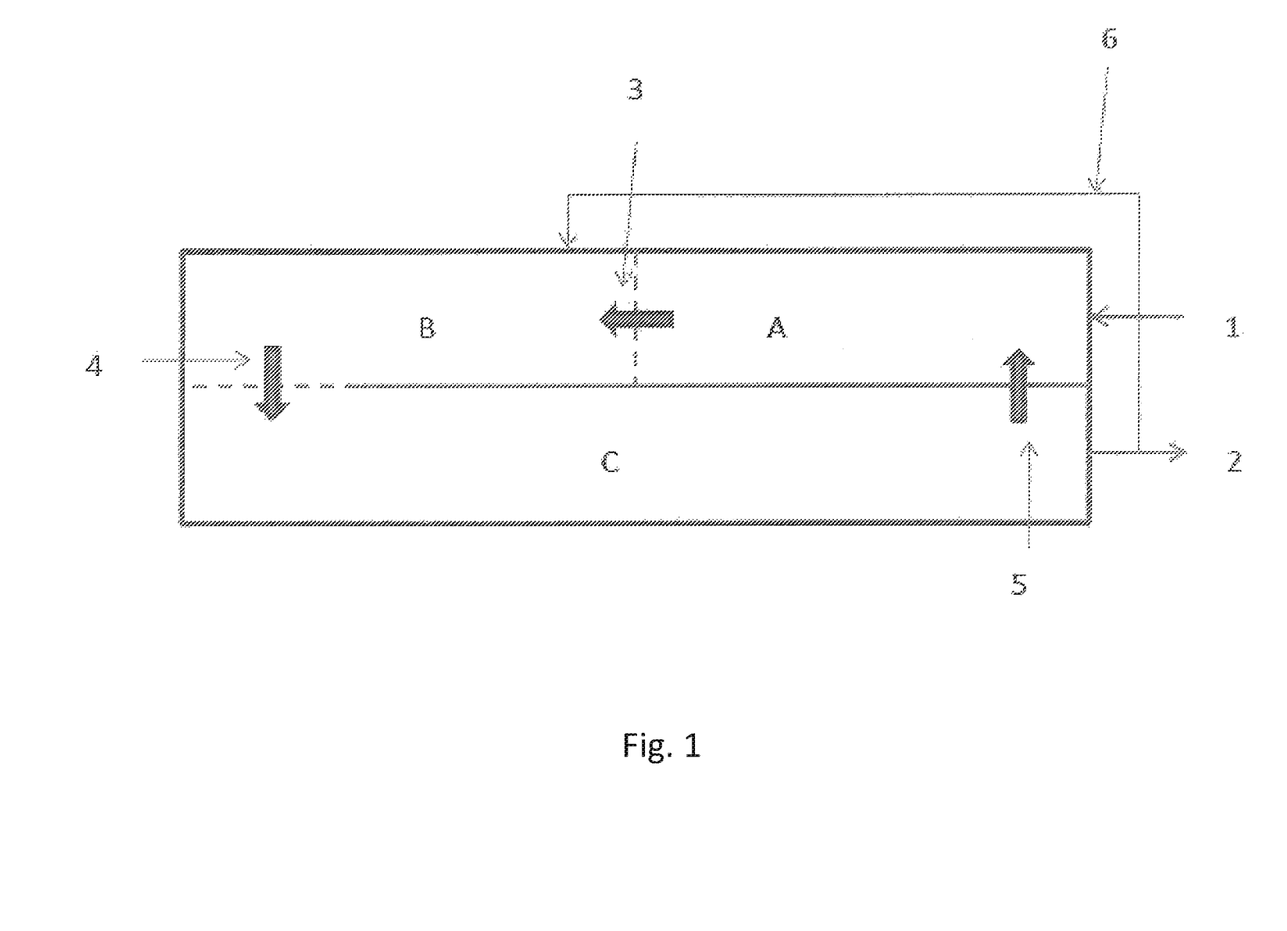
FIG. 1 shows a schematic outline of an embodiment of the present invention.

In the following an embodiment of the invention, reactor and method, is described with reference to FIG. 1.

The biological reactor comprises an anaerobic (A), optionally an anoxic (B), and an aerobic (C) zone, all including carrier media for bio film. The waste water to be purified flows into the first zone of the reactor through an inlet (1). The separation of the different zones are made in such a way that waste water and carrier media can flow together from one zone to the next, or they can be mechanically (3,4) moved for instance by an impeller or channel transport device. At the end of the last zone (C) of the reactor the carrier media, without water, is mechanically moved (5) to the inlet end of the first process zone (A). Moving of the carrier media is carried out by use of one or more mechanical devices such as e.g. elevators, transport screws, belt conveyers or the like. The mechanical devices allows the water to drain of, thus allowing the water-free return of the biofilm carriers to the anaerobic zone. Each zone (anaerobic (A), anoxic (B), aerobic (C)) may be separated in several consecutive chambers, or designed as long channels to achieve as much plug flow as possible. The treated waste water, without the biofilm carriers, leaves the aerobe zone (C) through one or more outlets (2). Optionally a part of the outlet stream (6) is re-introduced into the anoxic zone (B) for additional nitrogen removal. The stream (6) can be moved by e.g. use of a pump.

In this way the bacteria culture is subjected to alternating anaerobic and aerobic conditions to obtain enhanced biological phosphorus removal combined with the biofilm's efficiency, simplicity and good separation properties with respect to sludge separation. At the end of the aerobic zone, the biofilm carriers are transferred mechanically to the anaerobic zone without transfer of water. In this way, one or more embodiments of the present invention prevent the oxygen-rich water from the aerobe zone in being carried back to the anaerobic zone, thus avoiding inhibition of the anaerobic zone with $O_2$.

The process will effectively provide removal of phosphorous and organic material, and if the process is extended with an anoxic zone and a return of water from the aerobic to the anoxic zone also removal of nitrogen/ammonium.

It is also possible to achieve complete/partly nitrogen removal by simultaneous nitrification/de-nitrification in the aerobic zone.

Since there is no waste water transported from the aerobic to the anaerobic zone, inhibition of the anaerobic zone by $NO_3$ is avoided.

The biofilm carriers are mechanically moved (5) from the aerobic zone (C) to the anaerobic zone (A) without the water, and in this way, one or more embodiments of the present invention prevent nitrate from being carried back to the anaerobic zone (A). Nitrates are dissolved in the water and as water is drained off as the biofilm carriers are moved (5) to the anaerobic zone (A) the nitrates are not carried over to the anaerobic zone (A).

Biofilm carriers varying in size, density, material and shape/design are known in the art, and any biofilm carrier may be suitable in accordance with one or more embodiments of the present invention.

For the separation of biofilm sludge following the biological process several methods are available e.g. flotation, sedimentation or fine screening. Any such methods known in the art can be used. In contrast to activated sludge from an activated sludge process, the sludge removed from water treated according to one or more embodiments the present invention comprises phosphorous in a plant available form and the sludge is thus a valuable resource as plant nutrient/fertilizer.

One or more embodiments of the present invention provide a continuous process which is area efficient compared with a batch run process. A batch process has to be run in several parallels to treat the same amounts of waste water as in a continuous process.

The inventors have demonstrated that it is possible to achieve enhanced biological phosphorous removal in a continuous biofilm process. One or more embodiments of the invention solve many of the problems associated with traditional biological phosphorous removal in activated sludge plants. One of the advancements achieved by one or more embodiments of the present invention is easier sludge separation and less sludge loss due to biofilm sludge. In addition, one or more embodiments of the invention has the advantage of less nitrate and less oxygen being transferred back to the anaerobic stage as water is allowed to drain off, and thus inhibition of the anaerobic zone by both $NO_3$ and $O_2$ is prevented. One or more embodiments of the present invention also results in smaller basin volumes compared to processes known from the prior art due to no return of water. The savings in basin volumes, compared to an activated sludge plant, based on an equal retention time can be about 50%. Thus, one or more embodiments of the present invention provide a continuous process with more efficient biological phosphorous removal than demonstrated in the prior art.

According to one or more embodiments of the present invention, a method for biological purification of waste water in a continuous process is provided where the method comprises the steps of a) receiving a pretreated waste water inlet stream (1) in an anaerobic zone (A) of a reactor wherein microorganism culture exist on freely moving biofilm carriers, b) letting the waste water stream with the biofilm carriers into an aerobic zone (C) aerating the waste water stream and carriers received from the anaerobic zone (A), c) at the end of the aerobic zone (C) transferring the biofilm carriers to the anaerobic zone without transfer of water, and d) discharge the water through an outlet (2) to a sludge separation process.

In an embodiment of the method an anoxic zone (B) is included between the anaerobic (A) and the aerobic (C) zones.

In another embodiment of the method a recycling (6) stream is e.g. pumped from the outlet (2) stream into the optional anoxic zone (B).

In a further embodiment of the method the carrier media with biofilm are mechanically (3,4) moved from one zone/chamber to the next.

In yet another embodiment of the resent invention, the filling ratio of carrier media is between 1% and 100%, preferably between 30% to 70%, of the wet volume of the reactor.

According to one or more embodiments of the invention, a reactor for continuous biological purification of waste water is provided, where the reactor comprises one or more inlets (1) for waste water to an anaerobic zone (A), optionally an anoxic zone (B), followed by an aerobic zone (C), a device (5) for transfer of biofilm carriers from the aerobic zone (C) to the anaerobic zone (A), and one or more outlets (2).

In an embodiment of the invention (the reactor) the devices for transfer of biofilm carriers allow water to drain off during transfer. The devices for transfer of biofilm carriers may be selected from elevators, transport screws, belt conveyers or the like.

EXPERIMENTAL

Example 1

The pilot plant used in the experiments has a total volume of 6.6 m3 for the biological treatment step. At the end of the aerobic zone the biofilm carriers were lifted up from the water by a transport screw, and delivered to the first anaerobic zone. The inlet wastewater was introduced to the first anaerobic zone, and withdrawn from the last aerobic zone. The biofilm carriers were flowing through the anaerobic zones and the aerobic zones following the wastewater stream. Both the anaerobic and the aerobic zones were divided into several compartments separated by a wall with a small opening where wastewater and carriers flew through. Separation of biofilm sludge was carried out in a flotation unit.

Figure 2:
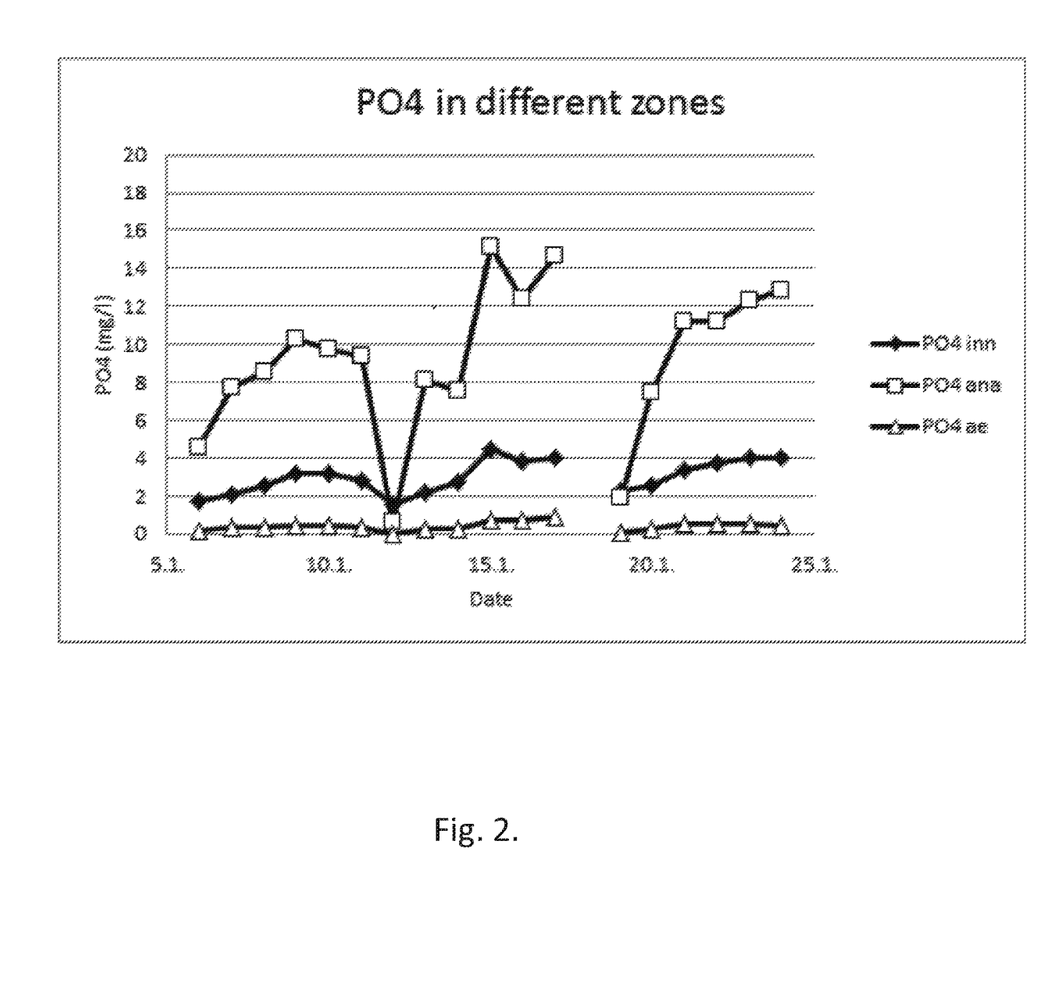
FIG. 2 shows inlet, anaerobic and aerobic $PO_4$ concentrations from the pilot experiments as described in Example 1

Pilot scale experiments were carried out in order to verify the process. Inlet wastewater to the pilot plant has been wastewater from Hias wastewater treatment plant in Norway, receiving wastewater from 4 municipalities in Hedmark County. In FIG. 2, the orthophosphate concentrations in the inlet, anaerobic and the aerobic zones are shown for some weeks of the experimental period.

Figure 3:
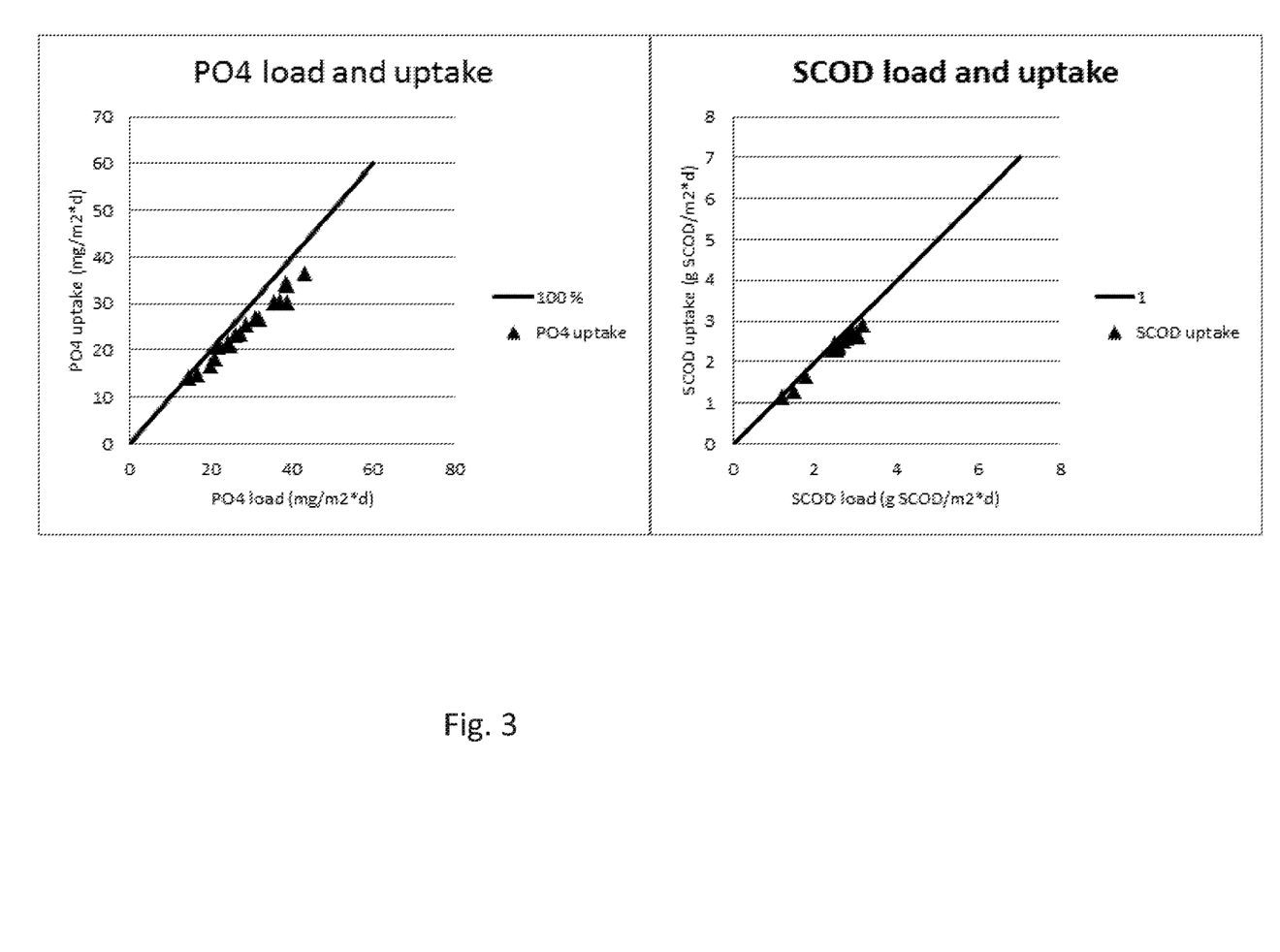
FIG. 3 shows $PO_4$ load and uptake and SCOD (soluble chemical oxygen demand) load and uptake as described in Example 1.

In FIG. 3 the PO4 load and uptake, and the SCOD load and uptake are shown for some pilot experiments.

Example 2

Another set of pilot scale experiments were carried out in order to verify the process.

The pilot plant used in the experiments has a total volume of 6.8 m3 for the biological treatment step. The inlet wastewater was introduced to the first anaerobic zone, and withdrawn from the last aerobic zone. The biofilm carriers were flowing through the anaerobic zones and the aerobic zones following the wastewater stream. Both the anaerobic and the aerobic zones were divided into several compartments separated by a wall with a small opening where wastewater and carriers were able to flow through. The anaerobic zones where mixed mechanically. In the following aerobic zones air was added by bubble diffusors located at the bottom. From the last aerobic zone the biofilm carriers were lifted up from the water by a conveyer belt, and delivered to the first anaerobic zone without transporting water. A standard MBBR carrier with 500 $m^2/m^3$ was used, and the filling ratio of carriers in relation to basin volume was 60%.

Wastewater flow into the plant was measured and controlled automatically and the oxygen level in the aerobic zones was measured continuously. Grab samples from the inlet, the outlet and the last anaerobic zone where taken each morning and analyzed for $PO_4$ and SCOD.

Inlet wastewater to the pilot plant has been wastewater from Hias wastewater treatment plant in Norway, receiving wastewater from 4 municipalities in Hedmark County. The wastewater was withdrawn from the treatment plant after primary sedimentation.

Figure 4:
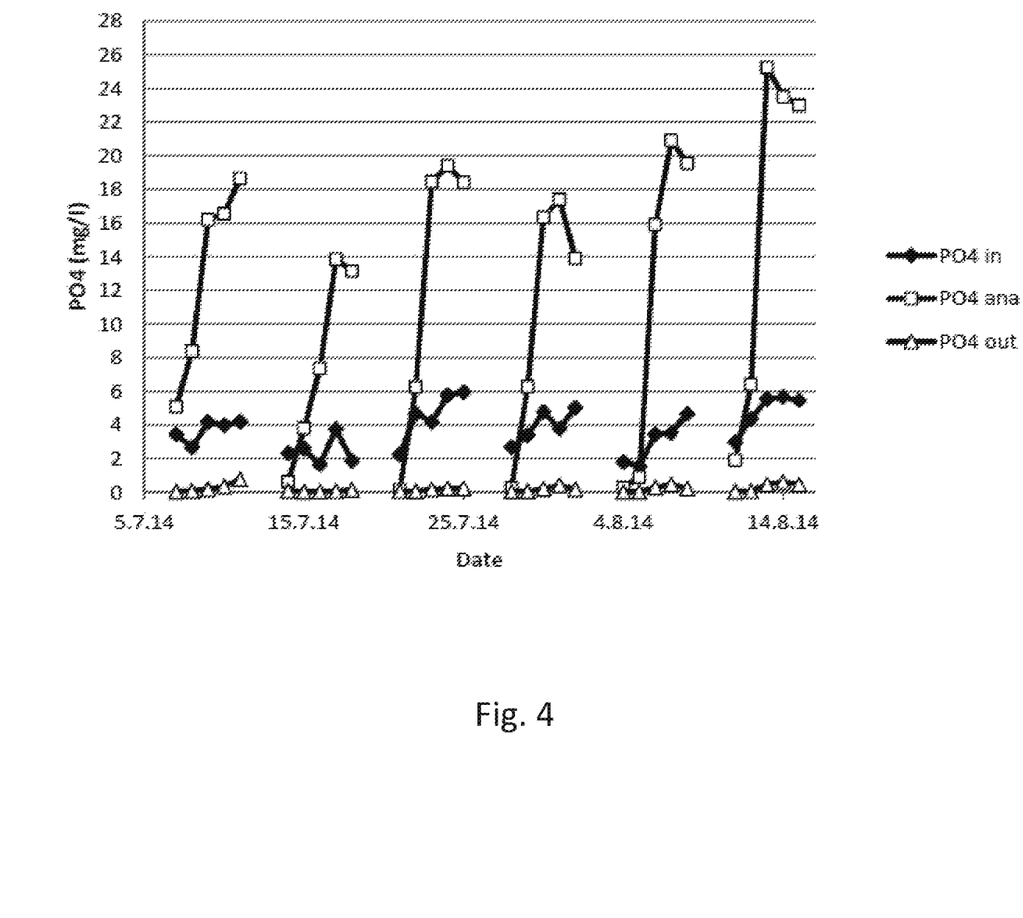
FIG. 4 shows inlet, anaerobic and aerobic $PO_4$ concentrations from the pilot experiments as described in Example 2.

In FIG. 4, the orthophosphate concentrations in the inlet, the anaerobic zone and the outlet are shown for some weeks of the experimental period. The results show variations in the inlet concentrations through the week and how this affects the $PO_4$ release in the anaerobic zone. The outlet concentration of $PO_4$ for this period was 0.20 mg/l on average.

Figure 5:
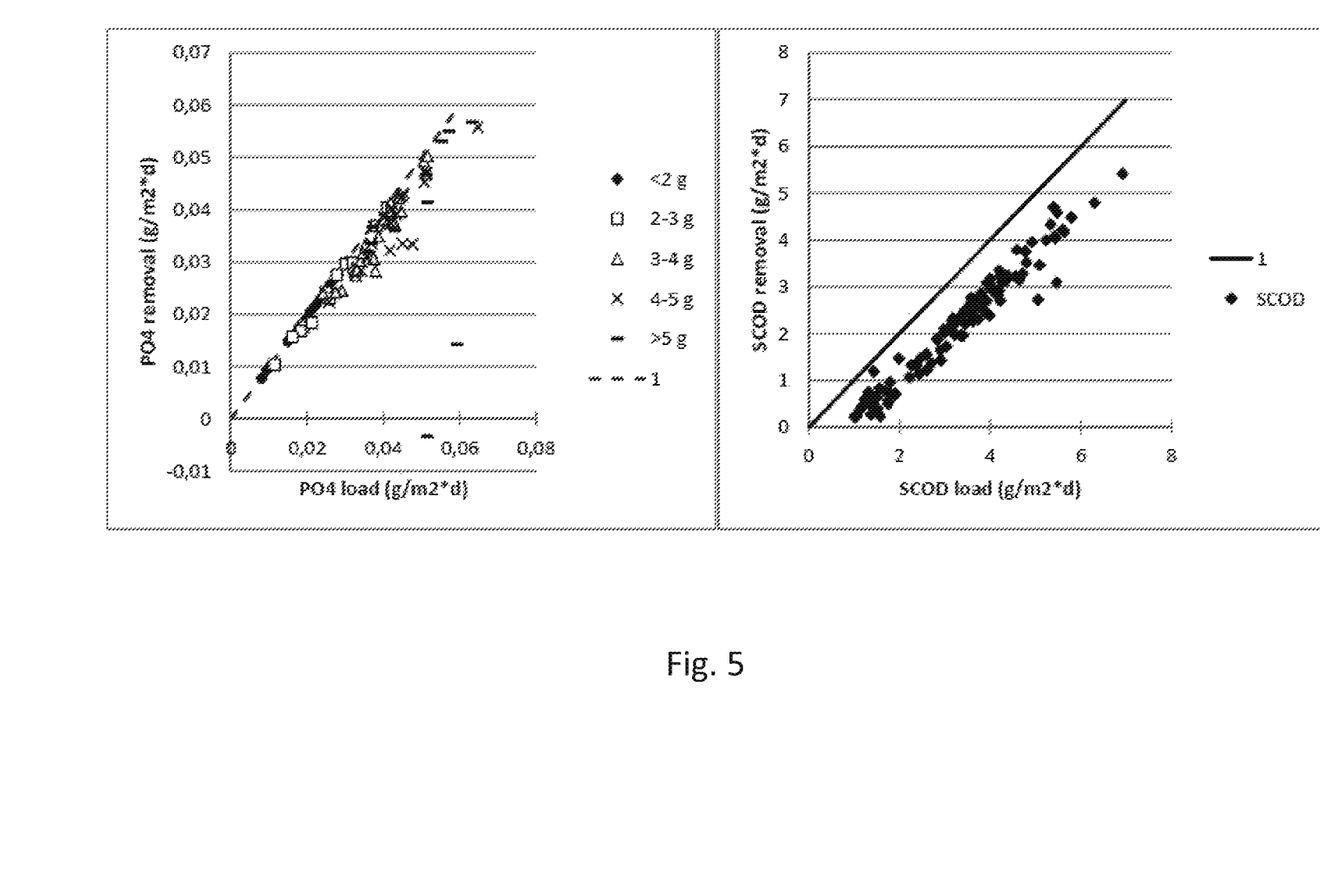
FIG. 5 shows $PO_4$ load and uptake and SCOD (soluble chemical oxygen demand) load and uptake as described in Example 2.

In FIG. 5 the PO4 load and uptake and the SCOD load and uptake as $g/m^2$ carrier area and day are shown. The $PO_4$ load is shown for different SCOD loads. From the figure it can be seen that for SCOD loads higher than 5 $g/m^2*d$, the removal of $PO_4$ can be reduced.

CONCLUSION

The results from the pilot studies show that it is possible to achieve enhanced biological phosphorous removal in a continuous biofilm process. Advantageously, the process according to one or more embodiments of the present invention may provide for easier sludge separation and less sludge loss due to biofilm sludge, less nitrate and oxygen transfer back to the anaerobic stage and less basin volumes due to no return of water/sludge. The savings in basin volumes, compared to an activated sludge plant, based on an equal retention time can be about 50%.

The invention claimed is:

1. A circulating moving bed biofilm method for biological purification of waste water in a continuous process comprising:
   receiving a pretreated waste water inlet stream in an anaerobic zone of a reactor wherein micro-organism culture exist on free flowing biofilm carriers,
   letting the waste water stream with the biofilm carriers into an aerobic zone aerating the waste water stream and carriers received from the anaerobic zone,
   at an end of the aerobic zone transferring the biofilm carriers to the anaerobic zone without transfer of water, and
   discharging the water through an outlet to a sludge separation process,
   wherein an amount of phosphate in the outlet stream is less than 0.5 mg/l.

2. The method according to claim 1 comprising an anoxic zone between the anaerobic and aerobic zone.

3. The method according to claim 1 comprising mechanical transfer of the biofilm carriers between zones/chambers.

4. The method according to claim 2 wherein a part of an outlet stream from the outlet is re-introduced into the anoxic zone.

5. The method according to claim 1 wherein the filling ratio of carrier media is between 1% and 100% of the wet volume of the reactor.

6. The method according to claim 1 wherein the outlet stream proceeds to a separation step for collection of sludge for further treatment, and discharge of purified water to a recipient.

7. The method according to claim 1, wherein an amount of phosphate in the outlet stream is less than 0.2 mg/l.

8. The method according to claim 1 wherein the filling ratio of carrier media is between 30% to 75% of the wet volume of the reactor.

9. A circulating moving bed biofilm reactor for continuous biological purification of waste water comprising:
   an inlet to an anaerobic zone, optionally an anoxic zone, followed by an aerobic zone;
   one or more devices for transfer of biofilm carriers from the aerobic zone to the anaerobic zone without water; and
   an outlet.

10. The reactor according to claim 9, wherein the one or more transport devices for transfer of biofilm carriers allow water to drain off.

11. The reactor according to claim 9, wherein the one or more transport devices are selected from the group consisting of: elevators, transport screws and belt conveyers.

* * * * *